United States Patent
Fullam et al.

(10) Patent No.: US 9,584,915 B2
(45) Date of Patent: Feb. 28, 2017

(54) SPATIAL AUDIO WITH REMOTE SPEAKERS

(71) Applicant: MICROSOFT TECHNOLOGY LICENSING, LLC, Redmond, WA (US)

(72) Inventors: Scott Francis Fullam, Palo Alto, CA (US); Lev Tcherkachine, Redmond, WA (US); Travis Legg, Seattle, WA (US); Lori Potts, Sammamish, WA (US); Annika Elias, Seattle, WA (US); Craig Haskins, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 31 days.

(21) Appl. No.: 14/599,957

(22) Filed: Jan. 19, 2015

(65) Prior Publication Data

US 2016/0212538 A1    Jul. 21, 2016

(51) Int. Cl.
*H04R 5/02* (2006.01)
*H04S 7/00* (2006.01)
(Continued)

(52) U.S. Cl.
CPC .............. *H04R 5/02* (2013.01); *G02B 27/017* (2013.01); *G06K 9/0057* (2013.01);
(Continued)

(58) Field of Classification Search
CPC ................ G06K 9/0057; G02B 27/017; G02B 2027/014; G02B 2027/0178;
(Continued)

(56) References Cited

U.S. PATENT DOCUMENTS 8,767,014 B2   7/2014  Vaught et al.
2004/0137929 A1*  7/2004  Jones ................. H04N 21/6582
                                                       455/517
(Continued)

FOREIGN PATENT DOCUMENTS

EP        2187658 A2   5/2010
WO     2014113891 A1   7/2014

OTHER PUBLICATIONS

ISA European Patent Office, International Search Report and Written Opinion Issued in Application No. PCT/US2015/067976, Mar. 10, 2016, WIPO, 11 Pages.
(Continued)

*Primary Examiner* — Muhammad N Edun
(74) *Attorney, Agent, or Firm* — Brianna Hinojosa-Flores; Judy Yee; Micky Minhas (57) ABSTRACT

Embodiments related to outputting spatial audio via a portable computing device are presented. For example, one disclosed embodiment provides a portable computing device for wirelessly detecting a presence of a remote speaker external to the portable computing device, determining a location of the remote speaker, and establishing a wireless connection with the remote speaker. The embodiment further includes presenting visual content via a display of the portable computing device, the visual content comprising an object positionally associated with a location in a real-world environment around the portable computing device, generating an audio signal corresponding to the object, and sending the audio signal to the remote speaker.

20 Claims, 5 Drawing Sheets

(51) Int. Cl.
| | |
|---|---|
| H04R 29/00 | (2006.01) |
| G06T 19/00 | (2011.01) |
| G06K 9/00 | (2006.01) |
| H04S 3/00 | (2006.01) |
| G02B 27/01 | (2006.01) |

(52) U.S. Cl.
CPC ......... *G06T 19/006* (2013.01); *H04R 29/001* (2013.01); *H04S 3/008* (2013.01); *H04S 7/40* (2013.01); *G02B 2027/014* (2013.01); *G02B 2027/0132* (2013.01); *G02B 2027/0138* (2013.01); *G02B 2027/0178* (2013.01); *H04R 2420/07* (2013.01); *H04S 7/301* (2013.01); *H04S 2400/11* (2013.01)

(58) Field of Classification Search
CPC .... G02B 2027/0138; G02B 2027/0132; G06T 19/006; H04R 2420/07; H04R 5/02; H04R 29/001; H04S 2400/11; H04S 3/008; H04S 7/40; H04S 7/301
See application file for complete search history.

(56) References Cited

U.S. PATENT DOCUMENTS

| | | |
|---|---|---|
| 2010/0309390 A1 | 12/2010 | Plut |
| 2012/0093320 A1 | 4/2012 | Flaks et al. |
| 2012/0113224 A1 | 5/2012 | Nguyen et al. |
| 2012/0242697 A1 | 9/2012 | Border et al. |
| 2013/0083018 A1 | 4/2013 | Geisner et al. |
| 2013/0196757 A1 | 8/2013 | Latta et al. |
| 2013/0328762 A1 | 12/2013 | McCulloch et al. |
| 2014/0101608 A1 | 4/2014 | Ryskamp et al. |
| 2014/0118631 A1 | 5/2014 | Cho |
| 2014/0146970 A1 | 5/2014 | Kim et al. |
| 2014/0160001 A1 | 6/2014 | Kinnebrew et al. |
| 2014/0192084 A1 | 7/2014 | Latta et al. |
| 2015/0204561 A1* | 7/2015 | Sadwick ................ F24F 11/006 236/1 C |
| 2016/0073197 A1* | 3/2016 | Hammer ............... H04W 12/04 381/80 |

OTHER PUBLICATIONS

Wu, et al., "Head Motion and Latency Compensation on Localization of 3D Sound in Virtual Reality", In Proceedings of the ACM symposium on Virtual Reality Software and Technology, Sep. 15, 1997, pp. 15-20.

"Sound Source Localization", Retrieved on: Sep. 5, 2014, Available at: http://www.plm.automation.siemens.com/en_us/products/lms/testing/acoustics/sound-source-localization.shtml.

IPEA European Patent Office, Second Written Opinion Issued in PCT Application No. PCT/US2015/067976, Nov. 17, 2016, WIPO, 6 pages.

\* cited by examiner

SPATIAL AUDIO WITH REMOTE SPEAKERS

BACKGROUND

An entertainment environment may include various different sound sources and audio output devices. For example, a home entertainment environment may include a television, a stereo, a desktop computer, a video game console, one or more mobile devices (e.g. smartphone, tablet, laptop, etc.), and each of these devices may output sound through one or more associated speakers.

SUMMARY

Examples related to outputting audio via a portable computing device utilizing external speakers are presented. For example, one disclosed embodiment provides a portable computing device configured to wirelessly detect a presence of a remote speaker external to the portable computing device, determine a location of the remote speaker, and establish a wireless connection with the remote speaker. The portable computing device is further configured to present visual content via a display of the portable computing device, the visual content comprising an object positionally associated with a location in a real-world environment around the portable computing device, generate an audio signal corresponding to the object, and send the audio signal to the remote speaker.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Some computing devices may be configured to provide an immersive, three-dimensional visual experience for a user. For example, an augmented reality display system, such as a see-through head-mounted display device, may display three-dimensional visual content such that the displayed content appears to be located within a surrounding real-world environment. Such computing devices may include one or more local speakers to output audio content associated with the visual content. However, sound provided via local speakers may appear to originate from a different location than the location of augmented reality content associated with the sound.

Thus, embodiments are disclosed that relate to detecting, via a portable computing device, one or more remote speakers located external to the portable computing device in a real-world environment surrounding the portable computing device, and establishing a wireless connection between the portable computing device and the one or more remote speakers. For example, the portable computing device may determine a location of each detected remote speaker in the real-world environment. Further, the portable computing device may present visual content including a virtual object positionally associated with a location in the real-world environment, such as an augmented reality image that is positioned at a particular location with respect to the real-world environment. To enhance the augmented reality presentation, audio content corresponding to the virtual object may be sent to a remote speaker located proximate the virtual object, such that the sound originates from a direction of virtual object. In this way, sound-producing devices already present in the environment may be utilized by the computing device to enhance the augmented reality experience provided to the user.

Figure 1:
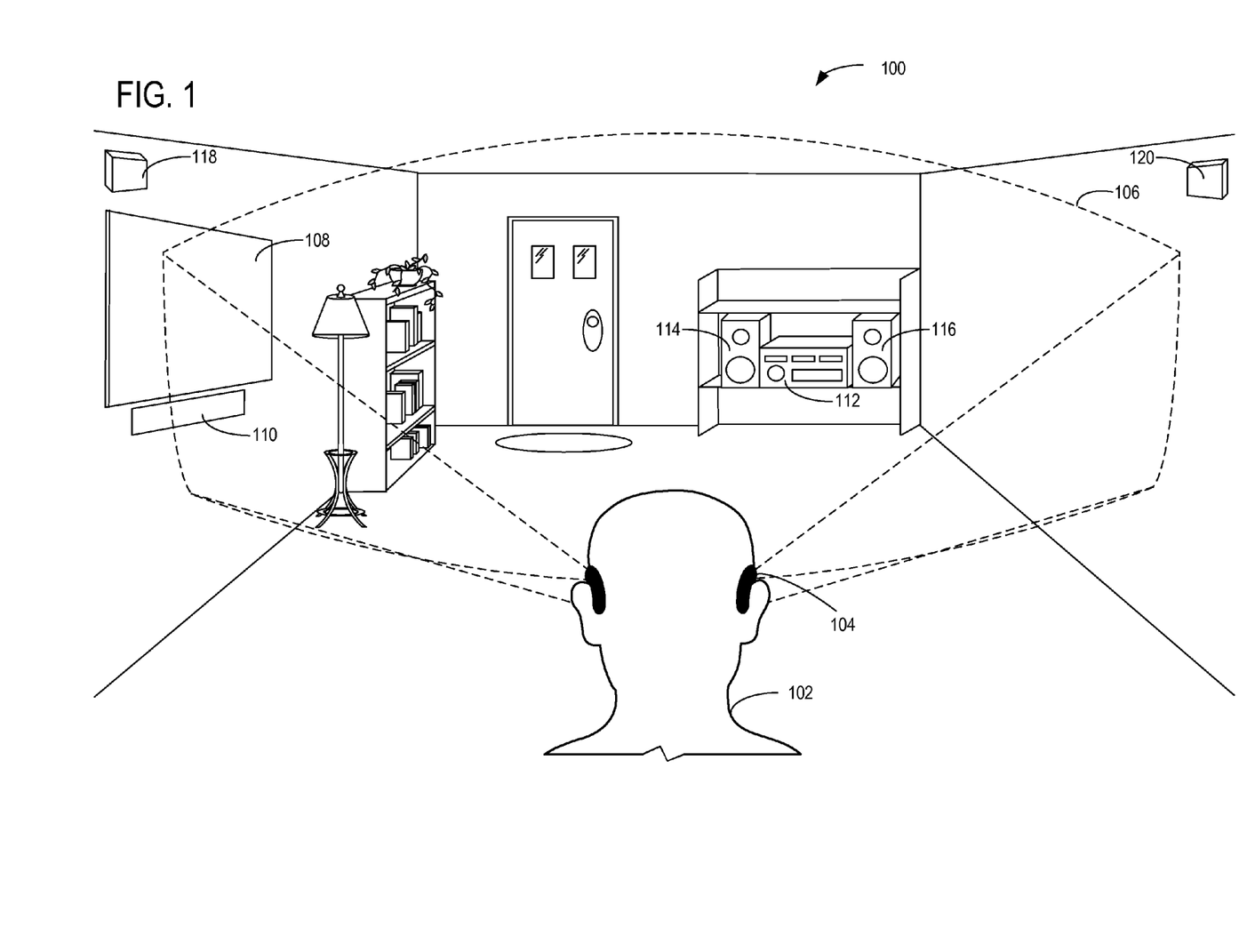
FIGS. 1-2 show an example environment for presenting audio content.

As mentioned above, in some implementations, the portable computing device may be a wearable computing device, such as a head-mounted display device. FIG. 1 shows an example use environment 100 comprising a head-mounted display (HMD) device 104 and a plurality of remote speakers. The HMD device 104 includes a see-through display that may be configured to visually augment an appearance of a physical environment to a user viewing the physical environment through the see-through display. Additional details regarding the HMD device 104 are described below.

Environment 100 includes scene 106 viewable through HMD device 104 when worn by user 102. It will be appreciated that, in some embodiments, the scene viewable through the see-through display of HMD device 104 may be substantially coextensive with the user's field of vision, while in other embodiments the scene viewable through the see-through display may occupy a portion of the user's field of vision.

HMD device 104 may be configured to wirelessly detect one or more remote sound-producing devices external to HMD device 104 within environment 100. Examples of remote sound-producing devices are shown as a first remote speaker 114, a second remote speaker 116, a third remote speaker 118, and a fourth remote speaker 120, each included as part of an audio system driven by receiver 112. Further, HMD device 104 may be configured to detect a sound bar 110 associated with television 108, and/or other sound-producing devices not illustrated, such as mobile phones, computing devices, etc. HMD device 104 may detect the presence of remote sound-producing devices in the environment via any suitable mechanism, such as using digital living network alliance (DLNA) protocols, over a wireless fidelity (WiFi) network, BLUETOOTH or near-field communication, or other discovery mechanism. Once one or more remote sound-producing devices have been discovered, a wireless connection may be established between the HMD device 104 and each remote-sound producing device. The wireless connection may be established automatically or in response to user input.

HMD device 104 may also determine a location in the real-world environment of each remote sound-producing device. The location of each remote sound-producing device may be determined automatically by the HMD device (e.g., without explicit user input) or the location of each remote sound-producing device may be determined based on user input. As one example, HMD device 104 may collect image information of environment 100 and use the image information to determine the location of each remote speaker and/or the sound bar. HMD device 104 may include one or more image sensors configured to collect depth and/or visible light image information. Using this image information, object identification may be performed in order to identify and locate each remote speaker within the physical environment surrounding HMD device 104. In another example, the image information may be analyzed to determine if user 102 is performing a gesture (e.g., pointing) indicating a location of one or more of the remote speakers and sound bar, such that a user can manually identify each speaker via gesture by gesturing toward it and/or verbally identifying it. As a more specific example, user 102 may place HMD device 104 in a detection mode wherein the HMD device is configured to interpret specific gestures performed by the user to mean that a speaker is located on or in the direction of the gesture. In a still further example, one or more speakers may be marked with a specific spatial or optical pattern that may be picked up by the one or more image sensors (e.g., visible light or IR/UV light sensors or a depth sensor).

As a further example, HMD device 104 may collect audio information of environment 100 via one or more microphones of the HMD device and determine the location of one or more of the remote speakers based on the audio information. In some examples, the microphones of the HMD device may comprise a microphone array including two or more microphones. For example, the user 102 may issue a voice command indicating a location of one or more of the remote speakers and sound bar, and the voice command may be detected by the microphones of the HMD device. In another example, after establishing a wireless connection with a remote speaker, the HMD device may sent a test audio signal to the remote speaker. That remote speaker may output audio upon receiving the test audio signal. The HMD device may then determine a location of the remote speaker based on feedback from a microphone array of the HMD device. Further, where two or more remote speakers are a part of a multi-channel audio system, HMD device 104 may determine a location of each remote speaker of the multi-channel audio system, for example by sending a test audio signal to each speaker sequentially and/or by sending separate audio frequencies for each speaker. During this test process, the channel that each remote speaker is operating according to may be mapped to each remote speaker.

As described above, HMD device 104 may comprise a see-through display configured to display an image of a virtual object. The virtual object may be part of a virtual model built based on a model of the real-world physical environment described above. As such, the virtual object may be placed in the virtual model at a location corresponding to a location in the real world environment. When the virtual object is displayed, it may appear to be located within the real-world environment that the user is viewing.

Figure 2:
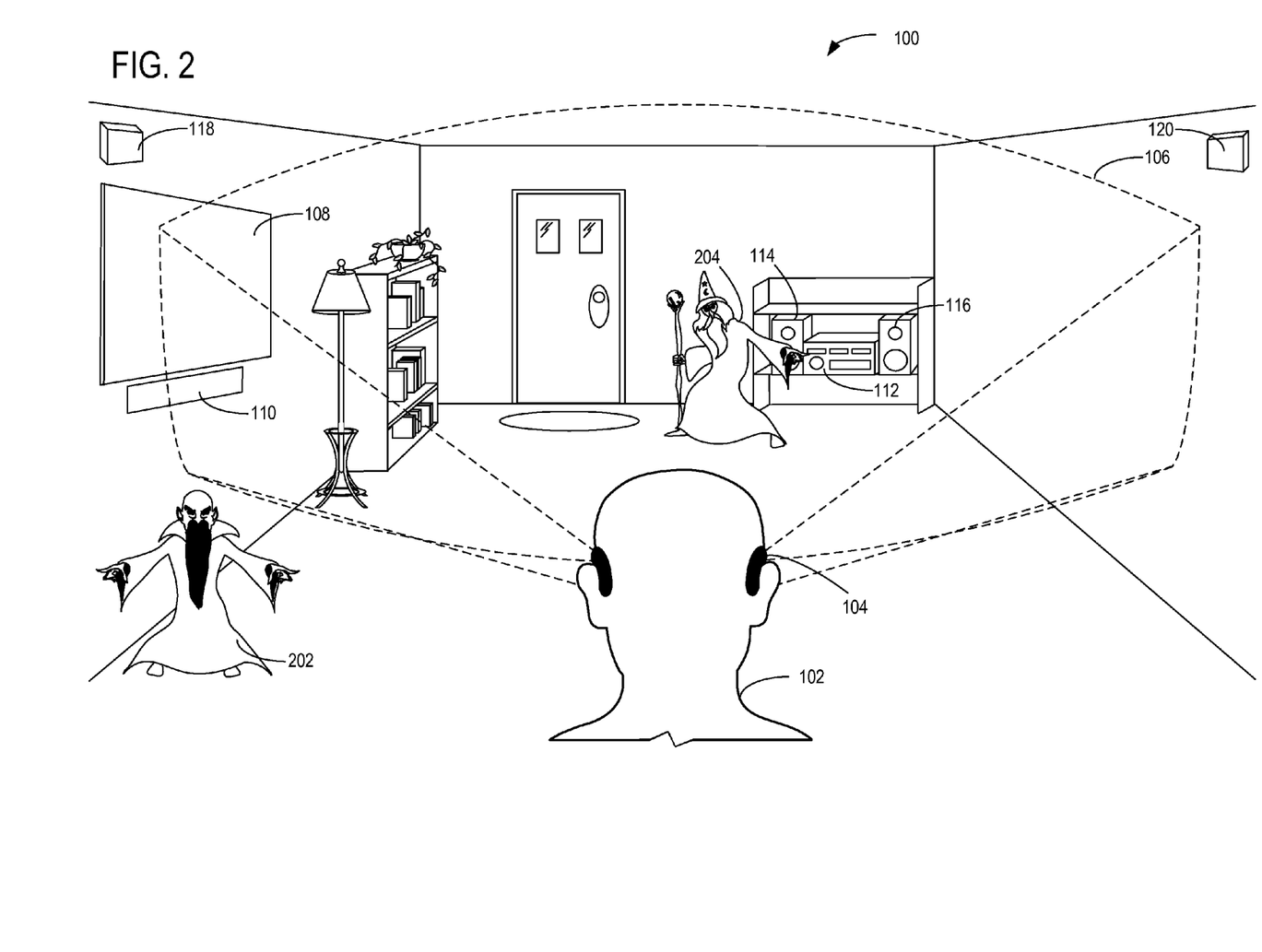

FIG. 2 shows examples of virtual objects displayed by HMD device 104. First, a wizard 202 is displayed positioned near television 108, and another wizard 204 is positioned near the audio system in environment 100. As shown in FIG. 2, wizard 202 is located out of the field of view of the user (e.g., out of scene 106). Thus, in some examples, virtual objects may be present in the virtual model even if the virtual objects are not displayed on the HMD device to the user.

The virtual model may also include audio content associated with a virtual object. For example, wizard 204 may have associated audio content (e.g., wizard 204 may be speaking). While HMD device 104 may display wizard 204 so that wizard 204 appears near a real-world object (e.g., the first remote speaker 114), the positioning of the speakers on HMD device 104 (e.g., near the ears of user 102) may not allow for the audio content associated with wizard 204 to sound as if it is being generated at the same location as wizard 204.

Thus, as described herein, HMD device 104 may utilize one or more external sound-producing devices in the real-world environment to provide spatial audio that corresponds to the three-dimensional placement of virtual objects. For example, audio content associated with wizard 204 may be sent to first remote speaker 114, and audio content associated with wizard 202 may be sent to one or more of third remote speaker 118 and sound bar 110 due to the relative locations of the virtual objects and speakers. This may help to create an effect of the sounds originating from the associated virtual objects. While the external speakers are depicted as being speakers for sound sources external to HMD device 104, in other examples, the external speakers may be configured for use with the HMD as a peripheral accessory for the HMD. In Further, in some examples the portable computing device may be configured to wirelessly detect and establish a connection with one or more remote microphones located external to the portable computing device.

Figure 3:
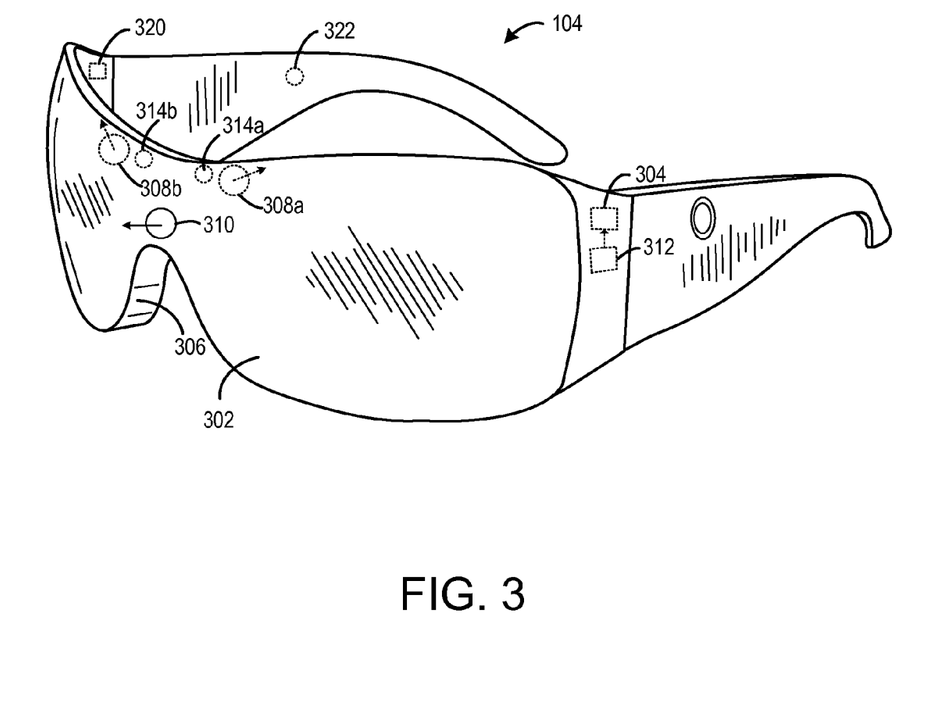
FIG. 3 schematically shows an example of a head-mounted display device.

FIG. 3 shows a non-limiting example of the HMD device 104 in the form of a pair of wearable glasses with a see-through display 302. It will be appreciated an HMD device may take any other suitable form in which a transparent, semi-transparent, and/or non-transparent display is supported in front of a viewer's eye or eyes. Further, embodiments described herein may be used with any other suitable computing device, including but not limited to mobile computing devices, laptop computers, desktop computers, tablet computers, other wearable computers, etc.

The HMD device 104 includes a see-through display 302 and a controller 304. The see-through display 302 may enable images such as holographic objects to be delivered to the eyes of a wearer of the HMD device. The see-through display 302 may be configured to visually augment an appearance of a real-world, physical environment to a wearer viewing the physical environment through the transparent display. In one example, the display may be configured to display one or more UI objects on a graphical user interface. In some embodiments, the UI objects presented on the graphical user interface may be virtual objects overlaid in front of the real-world environment. Likewise, in some embodiments, the UI objects presented on the graphical user interface may incorporate elements of real-world objects of the real-world environment seen through the see-through display 302. In other examples, the display may be configured to display one or more other graphical objects, such as virtual objects associated with games, videos, or other visual content.

Any suitable mechanism may be used to display images via the see-through display 302. For example, the see-through display 302 may include image-producing elements located within lenses 306 (such as, for example, a see-through Organic Light-Emitting Diode (OLED) display). As another example, the see-through display 302 may include a display device (such as, for example a liquid crystal on silicon (LCOS) device or OLED microdisplay) located within a frame of HMD device 104. In this example, the lenses 306 may serve as, or otherwise include, a light guide for delivering light from the display device to the eyes of a wearer. Such a light guide may enable a wearer to perceive a 3D holographic image located within the physical environment that the wearer is viewing, while also allowing the wearer to view physical objects in the physical environment, thus creating a mixed reality environment.

The HMD device 104 may also include various sensors and related systems to provide information to the controller 304. Such sensors may include, but are not limited to, one or more inward facing image sensors 308a and 308b, one or more outward facing image sensors 310, an inertial measurement unit (IMU) 312, and one or more microphones 320. The one or more inward facing image sensors 308a, 308b may be configured to acquire image data in the form of gaze tracking data from a wearer's eyes (e.g., sensor 308a may acquire image data for one of the wearer's eye and sensor 308b may acquire image data for the other of the wearer's eye). The HMD device may be configured to determine gaze directions of each of a wearer's eyes in any suitable manner based on the information received from the image sensors 308a, 308b. For example, one or more light sources 314a, 314b, such as infrared light sources, may be configured to cause a glint of light to reflect from the cornea of each eye of a wearer. The one or more image sensors 308a, 308b may then be configured to capture an image of the wearer's eyes. Images of the glints and of the pupils as determined from image data gathered from the image sensors 308a, 308b may be used by the controller 304 to determine an optical axis of each eye. Using this information, the controller 304 may be configured to determine a direction the wearer is gazing. The controller 304 may be configured to additionally determine an identity of a physical and/or virtual object at which the wearer is gazing.

The one or more outward facing image sensors 310 may be configured to receive physical environment data from the physical environment in which the HMD device 104 is located. Data from the outward facing image sensors 310 may be used to detect movements within a field of view of the display 302, such as gesture-based inputs or other movements performed by a wearer or by a person or physical object within the field of view. In one example, data from the outward facing image sensors 310 may be used to detect a selection input performed by the wearer of the HMD device, such as a gesture (e.g., a pinching of fingers, closing of a fist, etc.), that indicates selection of a UI object displayed on the display device. Data from the outward facing sensors may also be used to determine direction/location and orientation data (e.g. from imaging environmental features) that enables position/motion tracking of the HMD device 104 in the real-world environment.

The IMU 312 may be configured to provide position and/or orientation data of the HMD device 104 to the controller 304. In one embodiment, the IMU 312 may be configured as a three-axis or three-degree of freedom position sensor system. This example position sensor system may, for example, include three gyroscopes to indicate or measure a change in orientation of the HMD device 104 within 3D space about three orthogonal axes (e.g., x, y, z) (e.g., roll, pitch, yaw). The orientation derived from the sensor signals of the IMU may be used to display, via the see-through display, one or more virtual UI objects in three degrees of freedom.

In another example, the IMU 312 may be configured as a six-axis or six-degree of freedom position sensor system. Such a configuration may include three accelerometers and three gyroscopes to indicate or measure a change in location of the HMD device 104 along the three orthogonal axes and a change in device orientation about the three orthogonal axes. In some embodiments, position and orientation data from the outward facing image sensors 310 and the IMU 312 may be used in conjunction to determine a position and orientation of the HMD device 104.

The HMD device 104 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

Continuing with FIG. 3, the controller 304 may be configured to record multiple eye gaze samples over time based on information detected by the one or more inward facing image sensors 308a, 308b. For each eye gaze sample, eye tracking information and, in some embodiments, head tracking information (from image sensors 310 and/or IMU 312) may be used to estimate an origin point and a direction vector of that eye gaze sample to produce an estimated location at which the eye gaze intersects the see-through display. Examples of eye tracking information and head tracking information used to determine an eye gaze sample may include an eye gaze direction, head orientation, eye gaze velocity, eye gaze acceleration, change in angle of eye gaze direction, and/or any other suitable tracking information. In some embodiments, eye gaze tracking may be recorded independently for both eyes of the wearer of the HMD device 104.

As mentioned above, the HMD device 104 may also include one or more microphones, such as microphone 320, that capture audio data. In some examples, the one or more microphones 320 may comprise a microphone array including two or more microphones. For example, the microphone array may include four microphones, two positioned above the right lens and two positioned above the left lens of the HMD device. Further, audio outputs may be presented to the wearer via one or more speakers, such as speaker 322.

The controller 304 may include a logic machine and a storage machine, discussed in more detail below with respect to FIG. 5, in communication with the various sensors and display of the HMD device. In one example, the storage machine may include instructions that are executable by the logic machine to provide sound for a displayed virtual object to one or more external speakers, as described herein.

Figure 4:
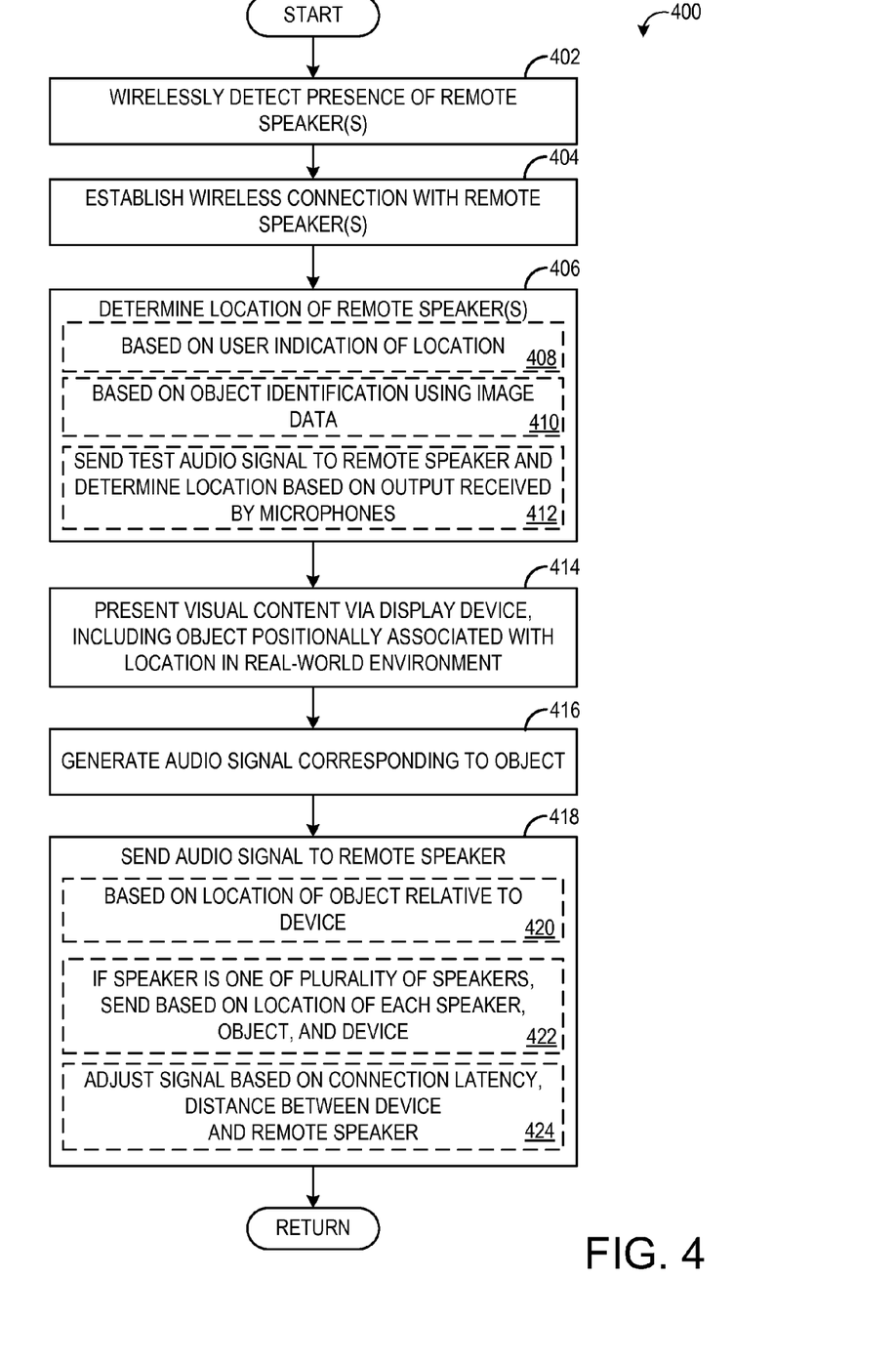
FIG. 4 shows a flow chart illustrating an example of a method for providing spatial audio using one or more remote speakers.

FIG. 4 shows a flow diagram depicting an example method 400 for providing spatial audio content via remote speakers. Method 400 may be performed by a computing device configured to present visual content and associated audio content, such as HMD device 104.

At 402, method 400 includes wirelessly detecting the presence of one or more remote speakers external to the computing device. As explained above, the computing device may automatically detect the presence of the one or more remote speakers, for example, according to a DLNA protocol or other suitable mechanism. Further, at 404, the computing device establishes a wireless connection with each detected remote speaker. The wireless connection may be a direct connection or may be a connection via an intermediary device, such as a network router, and may include a WiFi connection, WiFi Direct connection, BLUETOOTH, or other suitable wireless connection.

At 406, method 400 includes determining the location of each remote speaker. The location may be determined automatically or manually, and may be determined via image information, audio information, combinations thereof, and/or via any other suitable information. In one example, as indicated at 408, determining the location of the remote speaker(s) may include determining the location based on a user input that indicates the speaker location. The user indication may include a gesture performed by the user (such as pointing to the location of the remote speaker), which may be detected via data from image sensors of the computing device. The user indication alternatively or additionally may include a voice command issued by the user describing a location of the remote speaker, detected by the one or more microphones of the computing device.

In another example, indicated at 410, the location of the remote speaker may be determined based on object identification using image data captured by the image sensors of the computing device. For example, object identification may be performed on a depth map of the real-world environment surrounding the computing device, and the location of the remote speakers may be determined based on the object identification. In other examples, a visual marker may be placed by a user on the remote speaker, and the visual marker may be identified using the image data.

In a further example, as indicated at 412, the location of the remote speaker may be determined by the computing device sending a test audio signal to the remote speaker (over the wireless connection established previously). When the test audio signal is received by the remote speaker, the remote speaker outputs audio that is then detected by the microphones of the computing device. If the computing device includes a microphone array (e.g., two or more microphones), the received audio output can be used to determine the location of the remote speaker.

In some examples, two or more remote speakers in the environment may be part of a multi-channel audio system. In these cases, the location as well as the channel of each remote speaker of the audio system may be determined. For example, the computing device may be configured to send a first channel test audio signal, receive an output from a first remote speaker via the microphone array of the computing device, and determine a location of the first remote speaker based on signals from the microphone array. In doing so, the computing device may also map the first audio channel to the first remote speaker. For additional speakers, the computing device may be configured to send a second channel test audio signal, receive an output from a second remote speaker via the microphone array of the computing device, and determine a location of the second remote speaker based on signals from the microphone array. In doing so, the computing device may also map the second audio channel to the second remote speaker.

In a still further example, the location of each remote speaker may have been determined during a previous speaker discovery session. For example, the room in which the computing device is operating may be recognized by the computing device (e.g., via location information and/or image information) and metadata related to the room may be obtained by the computing device. The metadata may include information regarding the location and type of speakers present in the room, and may be stored locally on the computing device or obtained from a remote device. In this way, the location determination and mapping process of the speakers may be bypassed.

At 414, visual content is presented via the display device of the computing device. The visual content may include virtual reality content or augmented reality content. The visual content may include an object positionally associated with a location in the real-world environment. For example, the visual content may include a virtual wizard, as illustrated in FIG. 2, positioned near a real-world object (e.g., the first remote speaker of FIG. 2). The object may be located in a field of view of a user of the computing device, or the object may be located out of the field of view of the user. At 416, an audio signal corresponding to the object is generated. For example, the virtual wizard may have associated audio content (e.g., the wizard may be speaking) to be output along with the display of the wizard.

At 418, the audio signal is sent to one or more of the remote speakers. The audio signal sent to the remote speaker may include compressed or uncompressed rendered audio data in one example. In another example, the audio signal sent to the remote speaker may include audio content information for rendering audio data on a receiver of the remote speaker. For example, a frame of the virtual model used to generate the visual content and audio content may be sent to a receiver, and the receiver may render the audio data for output on a remote speaker. In some examples, the audio signal may be sent directly to the remote speaker. In other examples, the audio signal may be sent for presentation at the remote speaker, via a receiver, amplifier, renderer, or other intervening component. When more than one remote speaker is present and/or when the computing device is outputting multiple audio signals, each audio signal may include channel information to enable the audio signal to be output by the desired remote speaker.

The remote speaker or speakers selected to receive the audio signal may be based on the location of the object (e.g., the location in the real-world environment of which the object is positionally associated) relative to the computing device. For example, if the object is closer to the remote speaker than the computing device, the remote speaker may be selected to receive the audio signal. However, if the remote speaker is not closer to the object than the computing device, the audio signal may instead be output by the local speakers of the computing device. In examples where more than one remote speaker is present, the remote speaker closest to the location of the object may be selected to receive the audio signal. As such, if there is more than one remote speaker that the computing device has established a connection with, the remote speaker selected to receive the audio signal may be based on the location of the object, the location of the computing device, and the location of each of the plurality of remote speakers, as indicated at 422.

The audio signal sent to the remote speaker may be adjusted in some circumstances to account for connection latency between the computing device and the remote speaker and/or to account for the distance between the computing device and the remote speaker, as indicated at 424. While the audio signal associated with the object discussed above is sent to one remote speaker, in some examples additional audio signals may be associated with the presented visual content. These additional audio signals may be sent to other remote speakers in the real-world environment and/or sent to the local speakers of the computing device. To ensure the audio output from all the various sound-producing devices in the environment reaches the user at the desired time (e.g., at the same time and/or in synchronization with the presented visual content), the audio signal sent to the remote speaker may be adjusted relative to the audio signals sent to the other speakers. In one example, the latency in the connection between the computing device and the remote speaker may be determined, and the audio signal sent to the remote speaker may be adjusted based on the latency. The adjustment may include sending the audio signal to the remote speaker earlier than an audio signal sent to the local speakers of the computing device. In another example, the distance between the computing device and the remote speaker may be determined and the audio signal sent to the remote speaker adjusted based on the distance. The adjustment may include sending the audio signal to the remote speaker earlier than an audio signal sent to the local speakers of the computing device. In further examples, the audio signal sent to the remote speaker may change as a location of the computing device changes.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
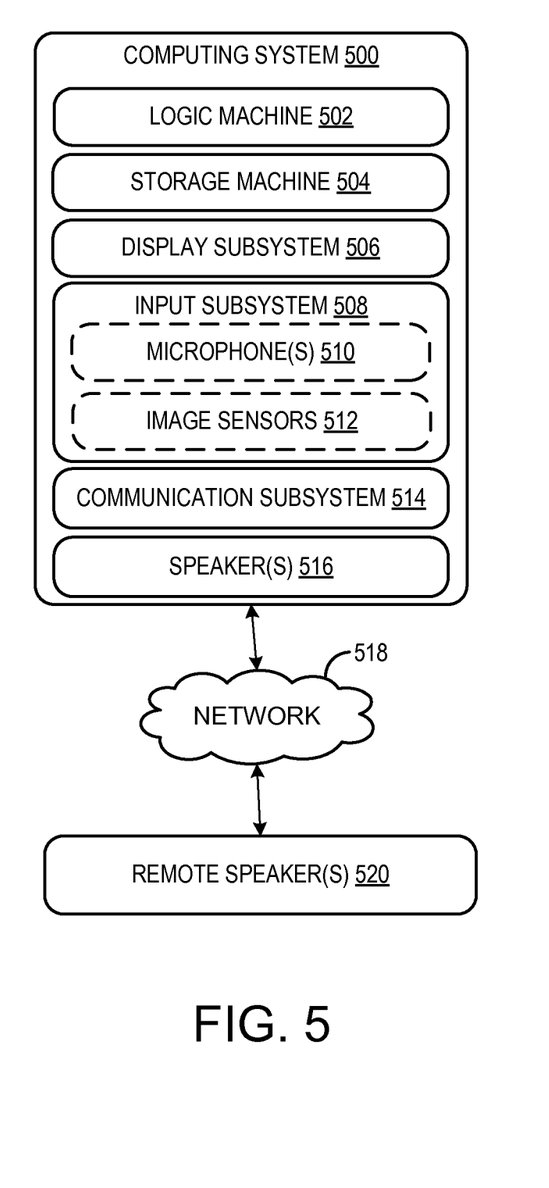
FIG. 5 shows an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices. HMD device 104 is one non-limiting example of computing system 500.

Computing system 500 includes a logic machine 502 and a storage machine 504. Computing system 500 may optionally include a display subsystem 506, input subsystem 508, communication subsystem 514, speakers 516 and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology, such as displays 302 of the HMD device 104 shown in FIG. 3. Such display devices may be combined with logic machine 502 and/or storage machine 504 in a shared enclosure, or such display devices may be peripheral display devices.

Input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include one or more microphones 510 for speech and/or voice recognition; image sensors 512, such as an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity any of the sensors described above with respect to FIG. 3; or any other suitable sensor.

Communication subsystem 514 may be configured to communicatively couple computing system 500 with one or more other computing devices. Communication subsystem 514 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet. In some examples, communication subsystem 514 may be configured to automatically detect and/or connect with one or more remote speakers 520, either directly or via a network 518. Additionally, computing system 500 may include an audio output device, such as one or more speakers 516.

Another example provides a method on a portable computing device comprising wirelessly detecting a presence of a remote speaker external to the portable computing device, determining a location of the remote speaker, establishing a wireless connection with the remote speaker, presenting visual content via a display of the portable computing device, the visual content comprising an object positionally associated with a location in a real-world environment around the portable computing device, generating an audio signal corresponding to the object, and sending the audio signal to the remote speaker. In such an example, sending the audio signal to the remote speaker additionally or alternatively comprises sending the audio signal to the remote speaker based on the location of the object relative to the portable device. In such an example, the object may be additionally or alternatively out of a field of view of a user viewing the presented visual content in some examples. In such an example, the object may additionally or alternatively be in a field of view of a user viewing the presented visual content in other examples. In such an example, the remote speaker may additionally or alternatively be one of a plurality of remote speakers, and the method may additionally or alternatively further comprise selecting a remote speaker to which to send the audio signal based on a location of each remote speaker, the location of the object, and a location of the portable computing device. In such an example, determining the location of the remote speaker may additionally or alternatively comprise detecting, based on feedback from one or more image sensors, a gesture performed by a user indicating the location of the remote speaker. In such an example, determining the location of the remote speaker may additionally or alternatively comprise performing object identification on image data collected by one or more image sensors. In such an example, determining the location of the remote speaker may additionally or alternatively comprise sending a test audio signal to the remote speaker, receiving an output from the remote speaker via a plurality of microphones on the portable computing device, and determining the location of the remote speaker based on signals from the plurality of microphones. In such an example, the remote speaker may additionally or alternatively be one of a plurality of remote speakers, and determining a location of each remote speaker of the plurality of remote speakers may additionally or alternatively comprise sending a first channel test audio signal, receiving an output from a first remote speaker via the plurality of microphones, and determining a location of the first remote speaker based on signals from the plurality of microphones. In such an example, the method may additionally or alternatively include sending a second channel test audio signal, receiving an output from a second remote speaker via the plurality of microphones, and determining a location of the second remote speaker based on signals from the plurality of microphones. In such an example, the visual content may additionally or alternatively comprise augmented reality content in one example. In such an example, sending the audio signal to the remote speaker may additionally or alternatively comprise sending compressed or uncompressed rendered audio data. In such an example, sending the audio signal to the remote speaker may additionally or alternatively comprise sending content information for rendering audio data on the receiver. Any or all of the above-described examples may be combined in any suitable manner in various implementations.

Another example provides a portable computing device comprising one or more sensors, a display, a logic machine, and a storage machine holding instructions executable by the logic machine to generate a model of a virtual environment including a virtual object, and audio content associated with the virtual object, determine a location of a plurality of remote speakers in a real-world environment around the portable computing device based on data from the one or more sensors, identify an audio channel corresponding to each remote speaker, and send the audio signal to one or more of the remote speakers based on a location of the virtual object in the model relative to the location of the one or more remote speakers in the real-world environment. In such an example, the one or more sensors may additionally or alternatively comprise one or more of an image sensor and a microphone array. To determine the location of the plurality of remote speakers and identify the audio channel corresponding to each remote speaker, the instructions may additionally or alternatively be executable to send a first channel test audio signal, receive an output from a first remote speaker via the microphone array, determine a location of the first remote speaker based on signals from the microphone array, and map the first channel to the first remote speaker. In such an example, the instructions may additionally or alternatively be further executable to send a second channel test audio signal, receive an output from a second remote speaker via the microphone array, determine a location of the second remote speaker based on signals from the microphone array, and map the second channel to the second remote speaker. Any or all of the above-described examples may be combined in any suitable manner in various implementations.

Another example provides for a wearable computing device comprising one or more sensors, a see-through display, one or more speakers, a logic machine, and a storage machine holding instructions executable by the logic machine to wirelessly detect a presence of a remote speaker external to the wearable computing device, determine a location of the remote speaker based on image information collected by the one or more sensors, establish a wireless connection with the remote speaker, present augmented reality content via the see-through display, the augmented reality content comprising an object associated with a location in a real-world environment around the wearable computing device, generate an audio signal corresponding to the object, and send the audio signal to the remote speaker. In such an example, the instructions may additionally or alternatively be executable to determine a latency in a connection between the receiver and the wearable computing device and adjust the audio signal sent to the remote speaker based on the latency. In such an example, the instructions may additionally or alternatively be executable to determine a distance between the portable computing device and the remote speaker and adjust the audio signal based on the distance. In such an example, the instructions may additionally or alternatively be executable to generate a second audio signal corresponding to a second object associated with a second location in a real-world environment around the wearable computing device and send the second audio signal to the one or more speakers of the wearable computing device. In such an example, the remote speaker may additionally or alternatively be a first remote speaker, and the instructions may be additionally or alternatively executable to generate a second audio signal corresponding to a second object associated with a second location in a real-world environment around the wearable computing device and send the second audio signal to a second remote speaker. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof.

The invention claimed is:

1. On a portable computing device, a method comprising:
wirelessly detecting a presence of a remote speaker external to the portable computing device;
determining a location of the remote speaker;
establishing a wireless connection with the remote speaker;
presenting visual content via a display of the portable computing device, the visual content comprising an object positionally associated with a location in a real-world environment around the portable computing device;
generating an audio signal corresponding to the object; and
sending the audio signal to the remote speaker.

2. The method of claim 1, wherein sending the audio signal to the remote speaker comprises sending the audio signal to the remote speaker based on the location of the object relative to the portable device.

3. The method of claim 1, wherein the object is out of a field of view of a user viewing the presented visual content.

4. The method of claim 1, wherein the object is in a field of view of a user viewing the presented visual content.

5. The method of claim 1, wherein the remote speaker is one of a plurality of remote speakers, and further comprising selecting a remote speaker to which to send the audio signal based on a location of each remote speaker, the location of the object, and a location of the portable computing device.

6. The method of claim 1, wherein determining the location of the remote speaker comprises detecting, based on feedback from one or more image sensors, a gesture performed by a user indicating the location of the remote speaker.

7. The method of claim 1, wherein determining the location of the remote speaker comprises performing object identification on image data collected by one or more image sensors.

8. The method of claim 1, wherein determining the location of the remote speaker comprises sending a test audio signal to the remote speaker, receiving an output from the remote speaker via a plurality of microphones on the portable computing device, and determining the location of the remote speaker based on signals from the plurality of microphones.

9. The method of claim 8, wherein the remote speaker is one of a plurality of remote speakers, and wherein determining a location of each remote speaker of the plurality of remote speakers comprises:
sending a first channel test audio signal, receiving an output from a first remote speaker via the plurality of microphones, and determining a location of the first remote speaker based on signals from the plurality of microphones; and
sending a second channel test audio signal, receiving an output from a second remote speaker via the plurality of microphones, and determining a location of the second remote speaker based on signals from the plurality of microphones.

10. The method of claim 1, wherein the visual content comprises augmented reality content.

11. The method of claim 1, wherein sending the audio signal to the remote speaker comprises sending compressed or uncompressed rendered audio data.

12. The method of claim 1, wherein sending the audio signal to the remote speaker comprises sending content information for rendering audio data on the receiver.

13. A portable computing device, comprising:
one or more sensors;
a display;
a logic machine; and
a storage machine holding instructions executable by the logic machine to:
generate a model of a virtual environment including a virtual object and audio content associated with the virtual object;
present visual content on the display, the visual content including the virtual object;
determine a location of a plurality of remote speakers in a real-world environment around the portable computing device based on data from the one or more sensors;
identify an audio channel corresponding to each remote speaker; and
send the audio content to one or more of the remote speakers based on a location of the virtual object in the model relative to the location of the one or more remote speakers in the real-world environment.

14. The portable computing device of claim 13, wherein the one or more sensors comprise one or more of an image sensor and a microphone array.

15. The portable computing device of claim 14, wherein to determine the location of the plurality of remote speakers and identify the audio channel corresponding to each remote speaker, the instructions are executable to
send a first channel test audio signal;
receive an output from a first remote speaker via the microphone array;
determine a location of the first remote speaker based on signals from the microphone array;
map the first channel to the first remote speaker;
send a second channel test audio signal;
receive an output from a second remote speaker via the microphone array,
determine a location of the second remote speaker based on signals from the microphone array; and
map the second channel to the second remote speaker.

16. A wearable computing device, comprising:
one or more sensors;
a see-through display;
one or more speakers;
a logic machine; and
a storage machine holding instructions executable by the logic machine to
wirelessly detect a presence of a remote speaker external to the wearable computing device;
determine a location of the remote speaker based on image information collected by the one or more sensors;
establish a wireless connection with the remote speaker;
present augmented reality content via the see-through display, the augmented reality content comprising an object associated with a location in a real-world environment around the wearable computing device;

generate an audio signal corresponding to the object; and send the audio signal to the remote speaker.

17. The wearable computing device of claim 16, wherein the instructions are executable to determine a latency in a connection between the receiver and the wearable computing device and adjust the audio signal sent to the remote speaker based on the latency.

18. The wearable computing device of claim 16, wherein the instructions are executable to determine a distance between the portable computing device and the remote speaker and adjust the audio signal based on the distance.

19. The wearable computing device of claim 16, wherein the instructions are executable to generate a second audio signal corresponding to a second object associated with a second location in a real-world environment around the wearable computing device and send the second audio signal to the one or more speakers of the wearable computing device.

20. The wearable computing device of claim 16, wherein the remote speaker is a first remote speaker, and wherein the instructions are executable to generate a second audio signal corresponding to a second object associated with a second location in a real-world environment around the wearable computing device and send the second audio signal to a second remote speaker.

* * * * *